(12) United States Patent
Kim

(10) Patent No.: US 12,091,013 B2
(45) Date of Patent: Sep. 17, 2024

(54) ADVANCED DRIVER ASSISTANCE SYSTEM, VEHICLE HAVING THE SAME AND METHOD FOR CONTROLLING THE VEHICLE

(71) Applicant: HL KLEMOVE CORP., Incheon (KR)

(72) Inventor: Jaekyeong Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 168 days.

(21) Appl. No.: 17/126,634

(22) Filed: Dec. 18, 2020

(65) Prior Publication Data

US 2021/0197824 A1   Jul. 1, 2021

(30) Foreign Application Priority Data

Dec. 26, 2019   (KR) .................. 10-2019-0175514

(51) Int. Cl.
*B60K 35/00* (2024.01)
*B60K 35/22* (2024.01)
(Continued)

(52) U.S. Cl.
CPC ....... *B60W 30/18163* (2013.01); *B60K 35/00* (2013.01); *B60W 30/0956* (2013.01);
(Continued)

(58) Field of Classification Search
CPC ....... B60W 30/18163; B60W 30/0956; B60W 50/14; B60W 2050/143; B60W 2050/146; B60W 2554/801; B60W 2050/0005; B60W 2554/4041; B60W 2554/802; B60W 30/14; B60W 40/06; B60W 2420/42; B60K 35/00; B60K 2370/166; B60K 2370/175;
(Continued)

(56) References Cited

U.S. PATENT DOCUMENTS

2013/0268184 A1* 10/2013 Zagorski ............... G08G 1/166
                                                       701/300
2017/0120908 A1*  5/2017 Oniwa .............. B60W 50/0097
(Continued)

FOREIGN PATENT DOCUMENTS

JP    3778165      3/2006
JP    2018-2083    1/2018

*Primary Examiner* — Ian Jen
*Assistant Examiner* — Hossam M Abd El Latif
(74) *Attorney, Agent, or Firm* — Womble Bond Dickinson (US) LLP

(57) ABSTRACT

Provided is a vehicle including an autonomous driver assistance system. The vehicle is capable of: acquiring a road image while driving; recognizing other vehicles and lanes from the acquired road image; recognizing the recognized driving pattern of the other vehicle based on the recognized location information of the other vehicle and the recognized location information of the lane, determining whether the other vehicle is a vehicle that fails to comply with a safety driving obligation based on the recognized driving pattern, outputting warning information when it is determined that the other vehicle is not complying with the safety driving obligation; determining whether a lane change is necessary based on the recognized location information of the lane of the other vehicle and the driving pattern of the other vehicle; guiding the lane change when it is determined that it is necessary to change the lane.

20 Claims, 10 Drawing Sheets

(51) Int. Cl.
*B60K 35/28* (2024.01)
*B60Q 5/00* (2006.01)
*B60Q 9/00* (2006.01)
*B60R 21/0134* (2006.01)
*B60W 30/095* (2012.01)
*B60W 30/14* (2006.01)
*B60W 30/18* (2012.01)
*B60W 40/06* (2012.01)
*B60W 50/00* (2006.01)
*B60W 50/14* (2020.01)
*G06V 20/56* (2022.01)
*G06V 20/58* (2022.01)

(52) U.S. Cl.
CPC ............ *B60W 50/14* (2013.01); *G06V 20/58* (2022.01); *G06V 20/584* (2022.01); *G06V 20/588* (2022.01); *B60K 35/28* (2024.01); *B60K 2360/166* (2024.01); *B60K 2360/175* (2024.01); *B60K 2360/178* (2024.01); *B60K 2360/179* (2024.01); *B60W 2050/143* (2013.01); *B60W 2050/146* (2013.01); *B60W 2554/801* (2020.02)

(58) Field of Classification Search
CPC ........ B60K 2370/178; B60K 2370/179; B60K 2370/167; B60K 2370/176; B60K 2370/21; B60K 2370/152; B60K 2370/52; B60Q 5/00; B60Q 9/008; G06V 20/58; G06V 20/584
USPC .......................................................... 701/23
See application file for complete search history.

(56) References Cited

U.S. PATENT DOCUMENTS

| | | | |
|---|---|---|---|
| 2017/0120912 A1* | 5/2017 | Ishioka .................. | B60W 30/16 |
| 2019/0071072 A1* | 3/2019 | Seo ........................ | G05D 1/0214 |
| 2019/0375420 A1* | 12/2019 | Hou ....................... | G06N 3/044 |
| 2020/0180616 A1* | 6/2020 | Matsunaga .......... | B60R 21/0134 |
| 2020/0216075 A1* | 7/2020 | Park ..................... | B60W 50/14 |
| 2021/0056324 A1* | 2/2021 | Chen .................... | G06N 3/0454 |
| 2021/0101600 A1* | 4/2021 | Kato ..................... | B60Q 1/40 |
| 2022/0203834 A1* | 6/2022 | Nakao .................. | G06T 19/006 |

* cited by examiner

ADVANCED DRIVER ASSISTANCE SYSTEM, VEHICLE HAVING THE SAME AND METHOD FOR CONTROLLING THE VEHICLE

CROSS-REFERENCE TO RELATED APPLICATION

This application is based on and claims priority under 35 U.S.C. § 119 to Korean Patent Application No. 10-2019-0175514, filed on Dec. 26, 2019 in the Korean Intellectual Property Office, the disclosure of which is incorporated herein by reference.

BACKGROUND

Field

The present disclosure relates to an advanced driver assistance system, vehicle having the same and method for controlling the vehicle for preventing accidents with other vehicles.

Description of the Related Art

Recently, there have been development on various types of advanced driver assistance system (ADAS) that are designed to inform a driver of travelling information of a vehicle to prevent an accident from occurring due to driver's carelessness and perform autonomous driving for driver's convenience.

As an example, there is a technology that detects obstacles around the vehicle by mounting a distance sensor on the vehicle and warns the driver.

As another example, a distance to another vehicle is obtained through an electromagnet mounted on a bumper of a vehicle, and when the obtained distance to another vehicle is within a certain distance, it is determined as a collision situation. There is a technology that generates magnetic force by supplying power to an electromagnet, and thereby automatically brakes the vehicle in a collision situation.

Despite the fact that the vehicle has a driver assistance system for driver safety and convenience, it is difficult to predict the driving of other vehicles while driving under the influence of drunk driving, drowsiness, or other vehicles that are negligent.

SUMMARY

One aspect provides an advanced driver assistance system, vehicle having the same and method for controlling the vehicle for outputting warning information by recognizing a vehicle that is not complying with the safety driving obligation among other vehicles.

In accordance with one aspect of the present disclosure, an advanced driver assistance system, includes a camera configured to acquire an image of a road; a controller having a processor configured to process the acquired image of the road; and a display configured to display the image in response to a control command of the controller, and the controller may be configured to recognize lanes and other vehicles from the acquired road image, determine whether the other vehicle is a vehicle that fails to comply with the safety driving obligation based on the recognized lanes and the recognized location information of the other vehicle, and control the display to output warning information when it is determined that the other vehicle is a vehicle that fails to comply with the safety driving obligation.

The advanced driver assistance system may further include an output configured to output the warning information in response to the control command of the controller as a sound.

The controller may be configured to control the display to display the location information of the other vehicle.

The controller may be configured to recognize a driving pattern of the other vehicle based on a change in the distance between the recognized lane and the recognized vehicle, and determine whether the other vehicle is a vehicle that fails to comply with the safety driving obligation based on the recognized driving pattern.

The controller may be configured to determine that the other vehicle has infringed on the lane when it is determined that the recognized lane and the recognized other vehicle overlap in the acquired road image, and determine whether the other vehicle is a vehicle that fails to comply with the safety driving obligation based on the number of infringement of the lane.

The controller may be configured to recognize a driving pattern of the other vehicle based on the recognized location change of the other vehicle, and determine whether the other vehicle is a vehicle that fails to comply with the safety driving obligation based on the recognized driving pattern.

The controller may be configured to recognize the lane that the other vehicle is driving and the own lane, and determine whether a lane change is necessary based on the recognized location information of the lane of the other vehicle, the location information of the own lane, and the driving pattern of the other vehicle, and guide the change of lane through the display when it is determined that the lane change is necessary.

The controller may be configured to recognize the lane that the other vehicle is driving and the own lane when performing autonomous driving, and control the lane change based on the recognized location information of the lane of the other vehicle, the location information of the own lane, and the driving pattern of the other vehicle.

In accordance with another aspect of the present disclosure, a vehicle includes: a camera configured to acquire an image of a road; a controller configured to recognize other vehicles from the acquired road image, recognize the recognized driving pattern of the other vehicle based on the recognized location information of the other vehicle, determine whether the other vehicle is a vehicle that fails to comply with the safety driving obligation based on the recognized driving pattern, and control to output warning information when it is determined that the other vehicle is a vehicle that does not comply with the safety driving obligation; and a display configured to display the warning information and the location information of the other vehicle in response to a control command of the controller.

The controller may be configured to recognize a lane in the acquired road image, recognize the change in distance between the lane and the other vehicle based on the recognized location information of the lane and the recognized location information of the other vehicle, and recognize the driving pattern of the other vehicles based on the recognized distance change.

The controller may be configured to determine that the other vehicle has infringed on the lane when it is determined that the recognized lane and the recognized other vehicle overlap in the acquired road image, and determine whether the other vehicle is a vehicle that fails to comply with the safety driving obligation based on the number of infringement of the lane.

The controller may be configured to recognize the lane that the other vehicle is driving and the own lane, and determine whether a lane change is necessary based on the recognized location information of the lane of the other vehicle, the location information of the own lane, and the driving pattern of the other vehicle, and guide the change of lane through the display when it is determined that the lane change is necessary.

The controller may be configured to recognize the lane that the other vehicle is driving and the own lane when performing autonomous driving, and control the lane change based on the recognized location information of the lane of the other vehicle, the location information of the own lane, and the driving pattern of the other vehicle.

The vehicle may further include an obstacle detector configured to detect a distance to the other vehicle; and the controller may be configured to control an operation of claxon or high beam when the distance to the other vehicle is less than a reference distance.

In accordance with another aspect of the present disclosure, a controlling method of a vehicle, comprise acquiring a road image while driving; recognizing other vehicles and lanes from the acquired road image; recognizing the recognized driving pattern of the other vehicle based on the recognized location information of the other vehicle and the recognized location information of the lane, determining whether the other vehicle is a vehicle that fails to comply with a safety driving obligation based on the recognized driving pattern, outputting warning information when it is determined that the other vehicle is not complying with the safety driving obligation; determining whether a lane change is necessary based on the recognized location information of the lane of the other vehicle and the driving pattern of the other vehicle; guiding the lane change when it is determined that it is necessary to change the lane.

Recognizing the driving pattern of the other vehicle may include recognizing a driving pattern of the other vehicle based on a change in the distance between the recognized lane and the recognized vehicle, and determine whether the other vehicle is a vehicle that fails to comply with the safety driving obligation based on the recognized driving pattern.

Determining whether the other vehicle is a vehicle that fails to comply with a safety driving obligation may include: determining as a lane infringement of the other vehicle when it is determined that the recognized lane and the recognized other vehicle overlap in the acquired road image, and determining whether the other vehicle is a vehicle that fails to comply with the safety driving obligation based on the number of infringement of the lane.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
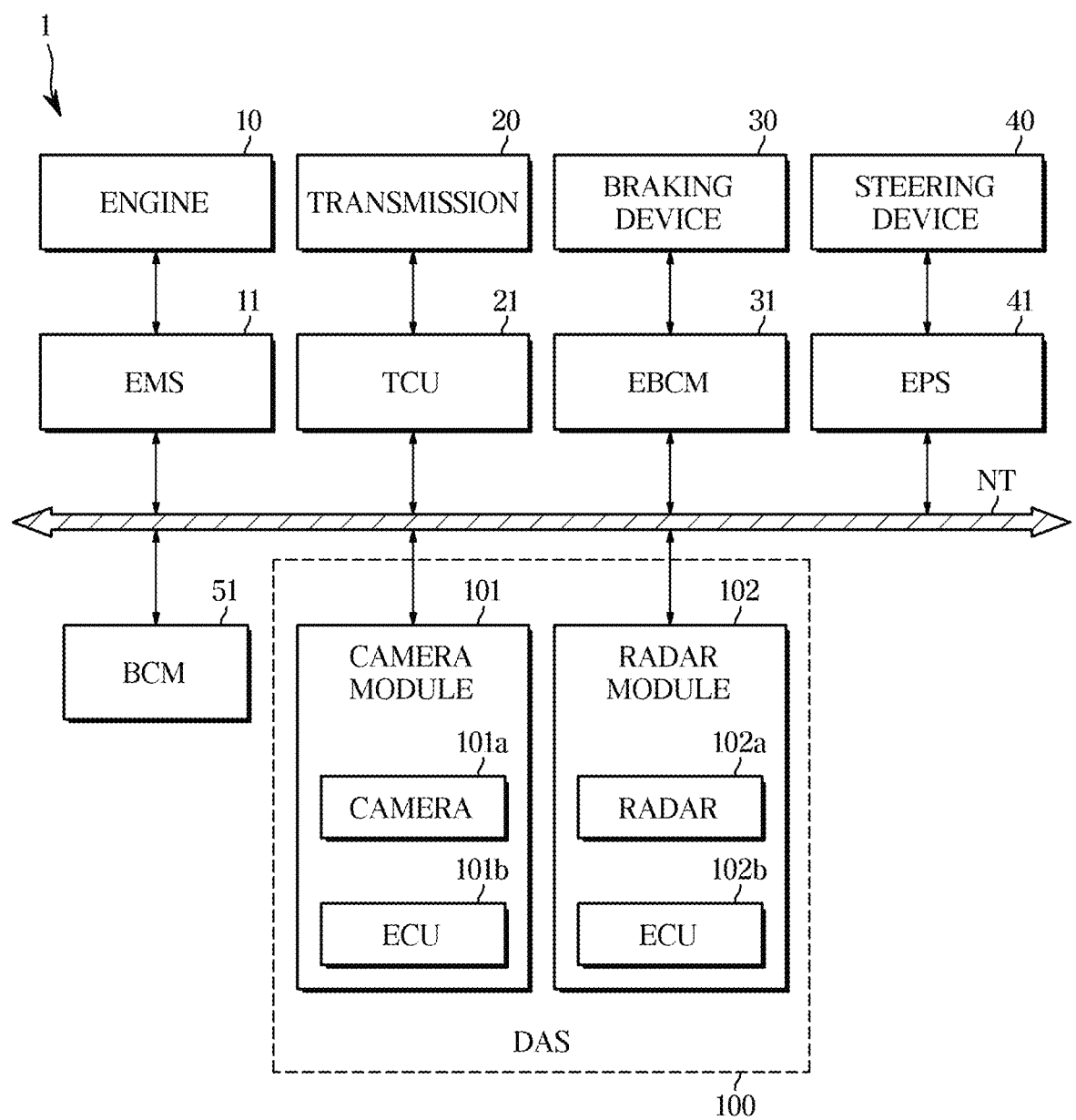
FIG. 1 is a block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

The vehicle according to the embodiment may be a vehicle that performs a manual driving mode in which a driver drives in response to a driving will and an autonomous driving mode that autonomously drives to a destination.

The vehicle according to the present exemplary embodiment outputs information on the possibility of a lane change when driving in the manual driving mode, or when driving in the autonomous driving mode, the vehicle may have a lane change assist device that controls lane change based on the possibility of lane change.

FIG. 1 is a block diagram illustrating a vehicle according to an embodiment.

Referring to FIG. 1, the vehicle 1 includes an engine 10, a transmission 20, a braking device 30, and a steering device 40.

The engine 10 may include a cylinder and a piston, and generate power for the vehicle 1 to travel.

The transmission 20 may include a plurality of gears, and transmit power generated by the engine 10 to wheels.

The braking device 30 may decelerate the vehicle 1 or stop the vehicle 1 through friction with the wheels.

The steering device 40 may change the travelling direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of a driver through an accelerator pedal or a request of an advanced driver assistance system (ADAS) 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

ADAS 100 may include a collision avoidance device that outputs notification information about a collision with an obstacle or avoids an obstacle in order to prevent a collision with an obstacle.

ADAS 100 determines whether other vehicles fail to comply with the safety driving obligation and outputs warning information to inform other vehicles of caution, or may include a warning device that outputs warning information for changing lanes to prevent collision with other vehicles. Here, the warning device may be a collision avoidance device.

ADAS 100 may include an autonomous driving control device that automatically drives to a destination by controlling the vehicle's driving according to a planned driving route while avoiding obstacles, determining the road environment and determining obstacles and driving conditions.

The ADAS 100 may include a camera module 101 for acquiring image data around the vehicle 1 and a radar module 102 for acquiring obstacle data around the vehicle 1.

The camera module 101 may include a camera 101a and an electronic control unit (ECU) 101b, and may photograph the front of the vehicle 1 and recognize other vehicles, pedestrians, cyclists, lanes, road signs, and the like.

The radar module 102 may include a radar 102a and an electronic control unit (ECU) 102b and may acquire relative positions and relative velocities of obstacles (e.g., other vehicles, pedestrians, cyclists, and the like) around the vehicle 1.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like.

ADAS 100 may transmit a drive control signal, a braking control signal, and a steering control signal to the engine management system 11, the electronic braking control module 31, and the electronic steering control device 41, respectively, through the vehicle communication network NT.

Figure 2:
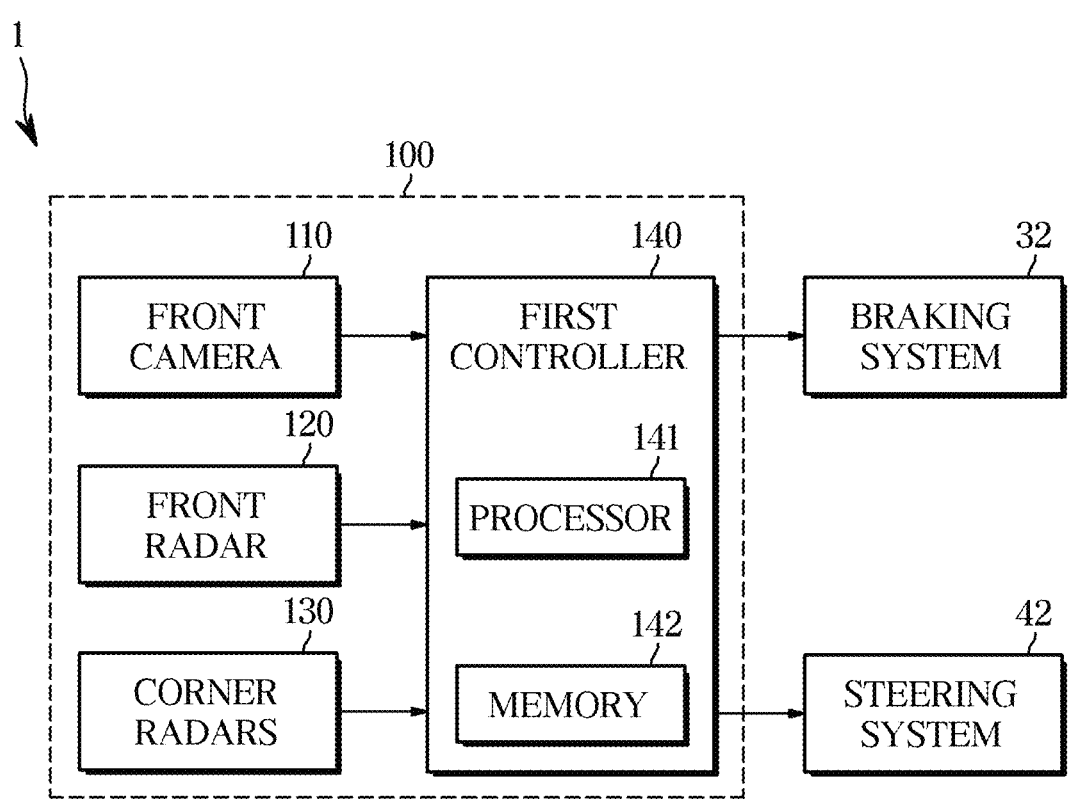
FIG. 2 is a block diagram illustrating an advanced driver assistance system (ADAS) provided in a vehicle according to an embodiment.
Figure 3:
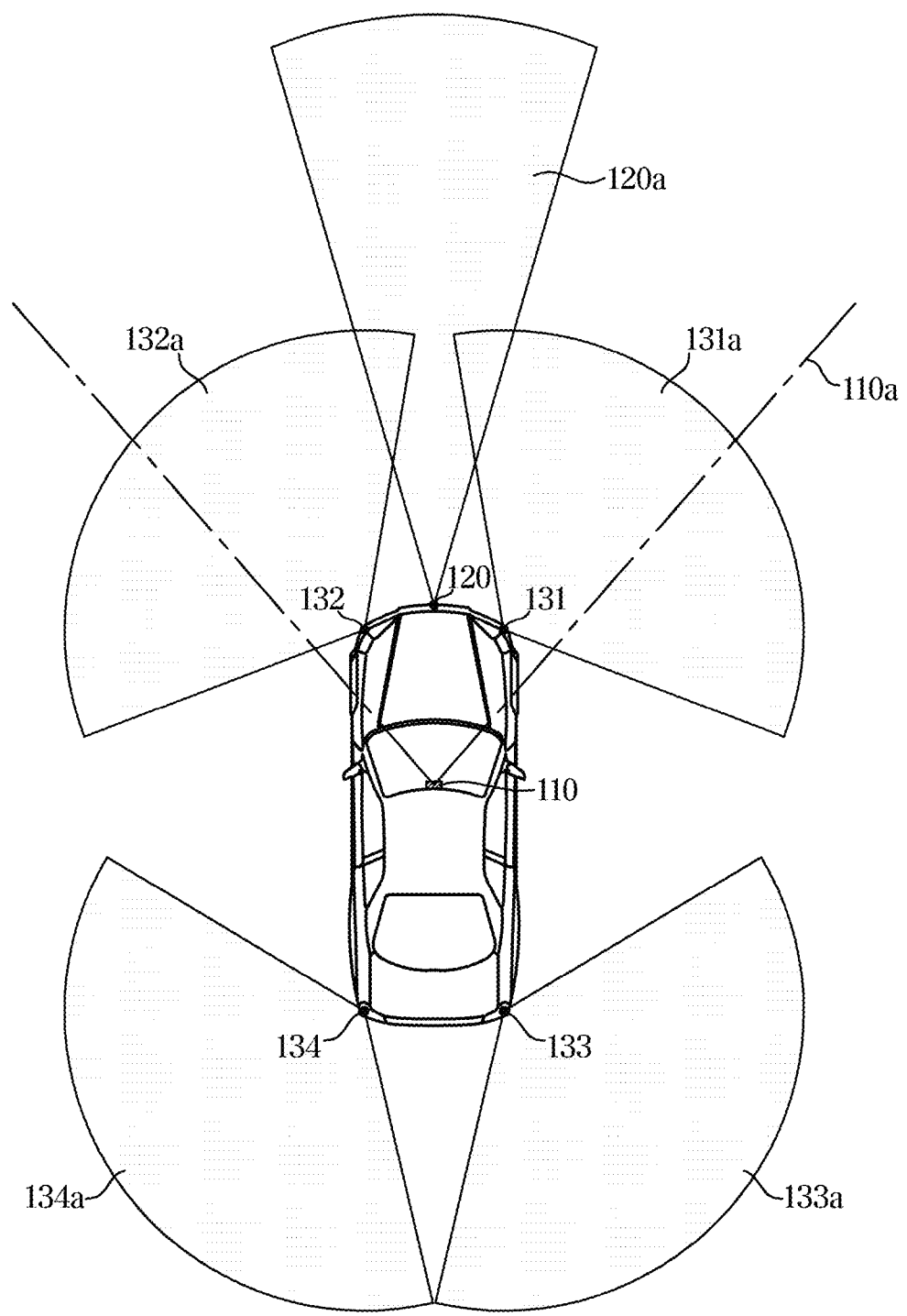
FIG. 3 is a diagram illustrating an example of a detection area of a camera and a radar included in an ADAS of a vehicle according to an embodiment.

FIG. 2 is a block diagram illustrating an ADAS provided in a vehicle according to an embodiment, and FIG. 3 is a diagram illustrating an example of a detection area of a camera and a radar included in an ADAS of a vehicle according to an embodiment.

The driver assistance system according to the present exemplary embodiment may perform a collision avoidance function to prevent collision with an obstacle when a lane is changed. That is, the driver assistance system of this embodiment may be a collision avoidance device.

The driver assistance system according to the present embodiment may be a lane change assistance device that outputs information on a possibility of changing a lane or controls lane change based on the possibility of changing a lane.

Referring to FIG. 2, the vehicle 1 may include a braking system 32, a steering system 42, and a ADAS 100.

The braking system 32 according to the embodiment may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The ADAS 100 according to the embodiment may include a front camera 110, a front radar 120, and the plurality of corner radars 130.

As shown in FIG. 3, the front camera 110 may have a field of view 110a facing forward of the vehicle 1. The front camera 110 may be installed, for example, in the front windshield of the vehicle 1.

The front camera 110 may photograph the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 may have a field of sensing 120a facing the front of the vehicle 1. The front radar 120 may be installed, for example, on a grille or bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may acquire front radar data from the transmission radio waves transmitted by the transmission antenna and the reflection radio waves received by the reception antenna.

Front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

As shown in FIG. 3, the first corner radar 131 may have a field of sensing 131a directed to the front right side of the vehicle 1. The first corner radar 131 may be installed on the right side of a front bumper of the vehicle 1. The second corner radar 132 may have a field of sensing 132a directed to the front left side of the vehicle 1, and may be installed on the left side of the front bumper of the vehicle 1. The third corner radar 133 may have a field of sensing 133a directed to the rear right side of the vehicle 1 and may be installed on the right side of a rear bumper of the vehicle 1. The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian or a cyclist (hereinafter, referred to as "an obstacle") existing on the front right side of the vehicle 1. The second corner radar data may include distance information and velocity information regarding an obstacle existing on the front left side of the vehicle 1. The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the first controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU (101b in FIG. 1) of the camera module (101 in FIG. 1) and/or the ECU (102b in FIG. 1) of the radar module (102 in FIG. 1), and/or an integrated ECU.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a cub, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time.

In response to the TTC less than a predetermined first reference time, the processor 141 may allow an alert to be output via audio and/or display.

In response to the TTC less than a predetermined second reference time, the processor 141 may transmit a preliminary-braking signal to the braking system 32.

In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the velocity information (relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
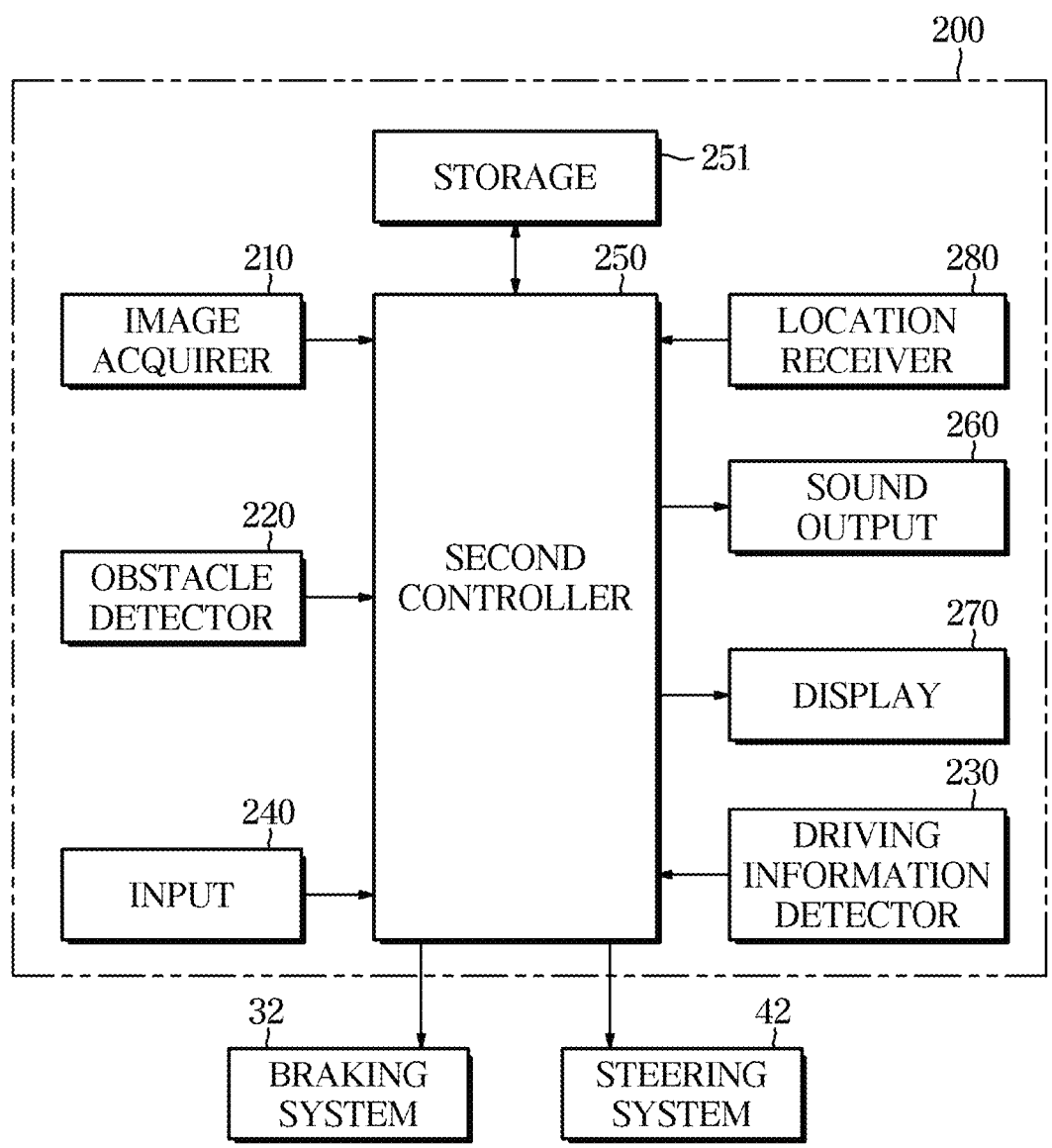
FIG. 4 is a block diagram of a warning apparatus among driver assistance systems provided in a vehicle according to an exemplary embodiment.

FIG. 4 is a block diagram of a warning apparatus among driver assistance systems provided in a vehicle according to an exemplary embodiment.

The warning apparatus 200 of the ADAS 100 includes an image acquirer 210, an obstacle detector 220, a driving information detector 230, an input 240, a second controller 250, a storage 251, a sound output 260 and a display 270, and the braking system 32 and the steering system 42 may be further included.

The image acquirer 210 acquires an image of the road, and transmits the acquired image information to the second controller 250. Here, the image information may be image data.

The image acquirer 210 may include the front camera 110, acquire image information of the road from the front image data captured by the front camera 110, and acquire the shape of an obstacle.

Here, the image information of the road may include an image of a lane and an image of another vehicle.

In addition, the shape of the obstacle may be information for recognizing the type of the obstacle. In addition, it is possible to obtain position information and speed information of an obstacle from image data captured by the front camera.

The obstacle detector 220 detects obstacles in the front and left and right sides of the own vehicle, and transmits obstacle information about the detected obstacle to the second controller 250. Here, the obstacle information may include position information of the obstacle, and the position information of the obstacle may include a distance to the obstacle and a direction of the obstacle.

The obstacle detector 220 may include a front radar 120 and first and second corner radars 131 and 132.

In addition, the obstacle detector 250 may also include a lidar sensor. The LiDAR (Light Detection And Ranging) sensor is a non-contact distance detection sensor using the principle of laser radar. The lidar sensor may include a transmitter that transmits a laser, and a receiver that receives a laser that returns after being reflected on a surface of an object existing within the sensor range.

The obstacle detector 250 may include an ultrasonic sensor.

The ultrasonic sensor generates ultrasonic waves for a certain period of time and then detects a signal that is reflected off an object and returned. Such an ultrasonic sensor may be used to determine the presence or absence of an obstacle such as a pedestrian within a short range.

The driving information detector 230 detects driving information of a vehicle such as driving speed information, driving direction information, and yaw rate information. Here, the driving information of the vehicle may be information on a driving speed, a driving direction, and a driving distance of the vehicle.

The driving information detector 230 may include at least one of a speed detector, a steering angle detector, and a yaw rate detector.

The speed detector may include a plurality of wheel speed sensors. The speed detection unit may include an acceleration sensor. The speed detector may include a plurality of wheel speed sensors and acceleration sensors.

When the speed detection unit is an acceleration sensor, the second controller 250 may acquire the acceleration of the own vehicle based on the information detected by the acceleration sensor, and obtain the driving speed of the own vehicle based on the obtained acceleration.

When the speed detector is an acceleration sensor and a plurality of wheel speed sensors, the second controller 250 acquires the acceleration of the own vehicle based on the information detected by the acceleration sensor, and may obtain the driving speed of the own vehicle based on speed information obtained by a plurality of wheel speed sensors.

The input 240 receives either a manual driving mode in which the driver directly drives the vehicle or an autonomous driving mode in which the driver drives automatically, and transmits the input signal to the second controller 250.

The input 240 may receive destination information, or may receive selection information for any one of a plurality of routes.

Here, the input 240 may be provided in a head unit or a center fascia in a vehicle, or may be provided in a vehicle terminal.

In the input 240, it is possible to receive information on a destination in the autonomous driving mode, or to receive a driving speed.

The input 240 may receive a selection of an anti-collision notification mode indicating a possibility of collision with an obstacle.

The input 240 may receive a warning mode for notifying the driver of attention to a vehicle that fails to comply with the safety driving obligation while performing the manual driving mode.

The second controller 250 generates a route from the current location to the destination based on the current location information and destination information received by the location receiving unit 280 and controls driving through the generated route.

The second controller 250 generates routes from the current location to the destination based on the current location information and destination information received by the location receiving unit 280, and controls driving based on information on a route selected by input 240 among the generated routes.

When performing the autonomous driving mode, the second controller 250 may control to travel at a preset driving speed or control to travel at a driving speed input by a user.

When the warning mode while driving is manually selected or when driving autonomously, the second controller 250 performs image processing on the image information acquired by the image acquirer 210 to recognize lanes and other vehicles on the road, recognizes the own lane in which the own vehicle is traveling based on the location information of the recognized lane, and recognizes the own lane and other vehicles running in the other lane based on the positions of both lanes in the own lane. The own lane and other vehicles driving in the other lane may be vehicles driving in front of the own vehicle.

The second controller 250 recognizes the driving pattern of other vehicles for each recognized lane.

Figure 5A:
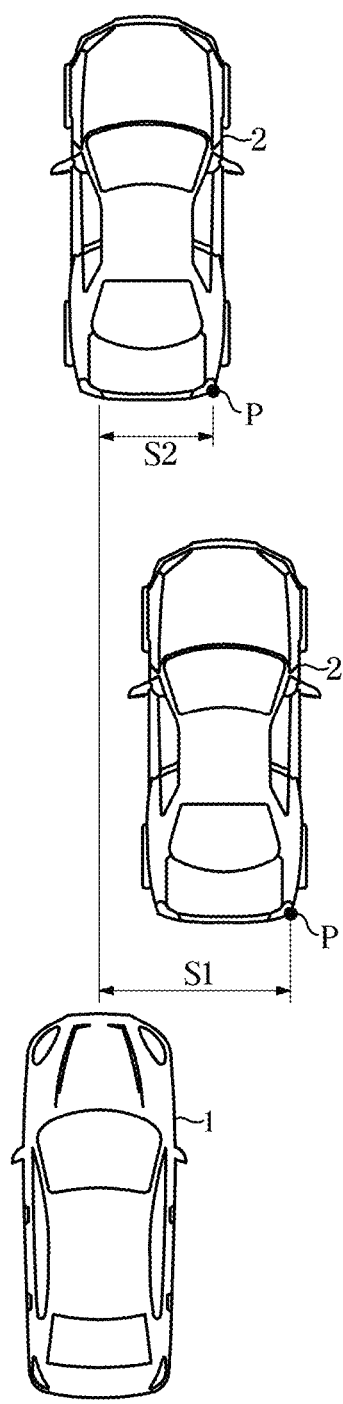
FIGS. 5A, 5B, and 5C are exemplary diagrams for recognizing a driving pattern of other vehicle in a vehicle according to an exemplary embodiment.

As shown in FIG. 5A, when recognizing the driving pattern of another vehicle for each recognized lane, the second controller 250 selects a part (p) of the other vehicle and recognizes a driving pattern of other vehicles based on a location change (s1->s2) of the selected part p. Here, the change in position may be a change in distance from the own vehicle in the horizontal direction.

When recognizing the driving pattern of other vehicles for each recognized lane, the second controller 250 may recognize a change in a relative position of a part of another vehicle based on a change in movement of the own vehicle based on driving information detected by the driving information detector 230. Here, the change in the movement of the subject vehicle may be a change in the movement distance of the subject vehicle in the left and right directions.

Figure 5B:
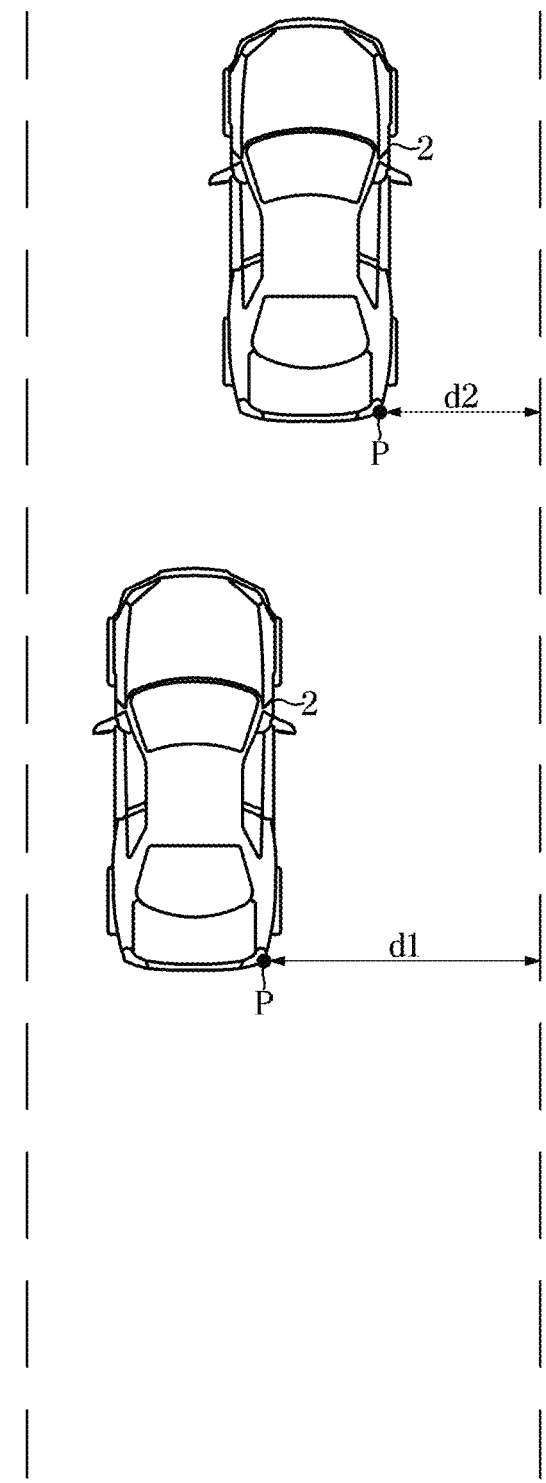
Figure 5C:
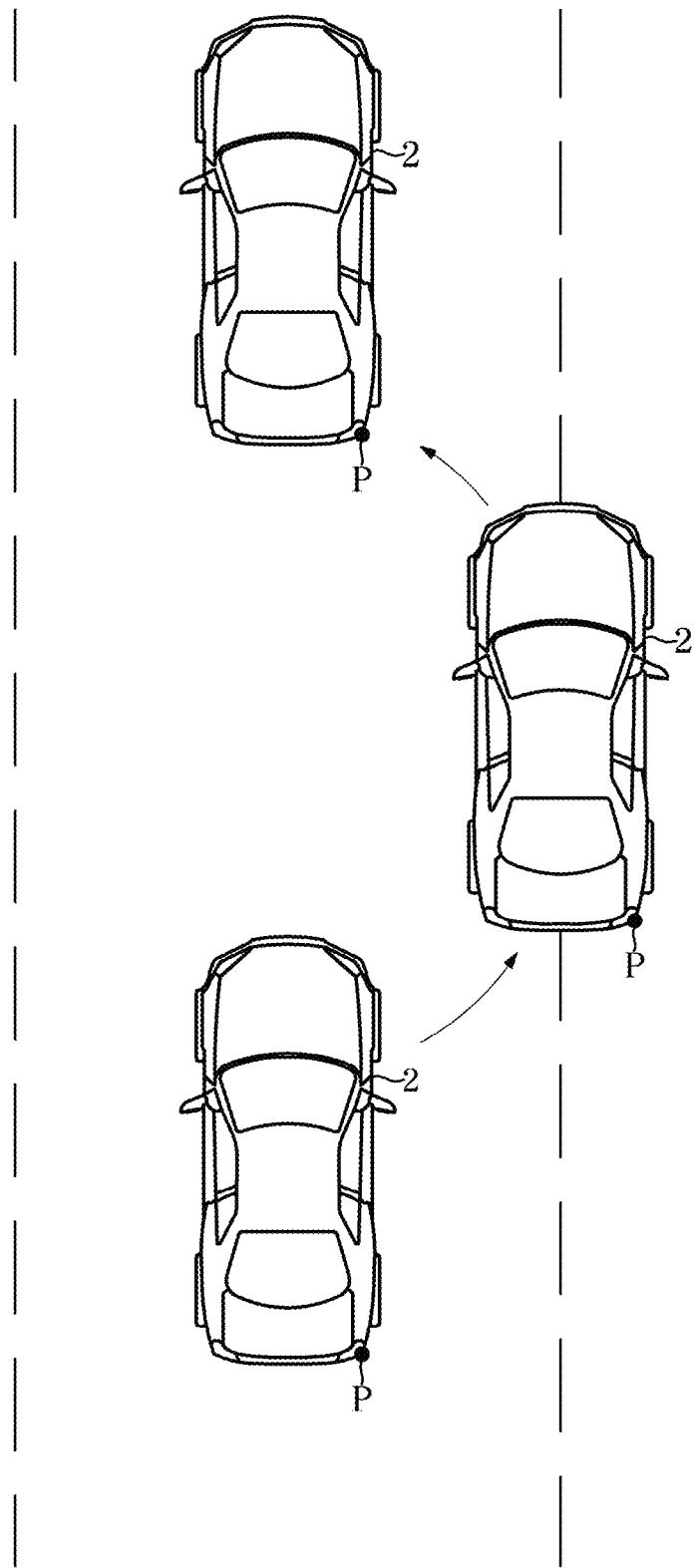

As shown in FIG. 5B, the second controller 250 may recognize a driving pattern of another vehicle based on a distance change (d1->d2) between the recognized lane and any one part p of the other vehicle.

As illustrated in FIG. 5B, the second controller 250 may determine whether another vehicle has invaded or deviated from the lane based on the recognized position of the other vehicle and the position of the lane.

The second controller 250 may recognize whether the other vehicle is a vehicle that is not complying with the safety driving obligation by analyzing the recognized driving pattern of another vehicle.

For example, Based on at least one of the recognized curvature of the driving pattern of another vehicle, the number of times the curvature changes within a set time, and the number of times the curvature changes within a set distance, the second controller 250 can recognize whether another vehicle is a vehicle that is not complying with the safety driving obligation.

As another example, the second controller 250 may acquire a similarity between the recognized driving pattern of another vehicle and a preset pattern, and if the obtained similarity is greater than or equal to the reference similarity, recognize the other vehicle as a vehicle that is not complying with the safety driving obligation.

The second controller 250 may determine whether another vehicle has invaded the lane based on whether the other vehicle and the lane recognized in the image overlap.

If it is determined that the recognized other vehicle has invaded one of the two lanes of the lane in which the other vehicle is running more than a preset number of times, the second controller 250 may recognize the vehicle as non-compliance with the safety driving obligation.

During manual driving, if another vehicle is recognized as a vehicle that is not complying with the safety driving obligation, the second controller 250 controls at least one of the display 270 and the sound output 260 to output the location information of the other vehicle and warning information notifying the attention of the other vehicle.

The second controller 250 may control the output of guidance information so that other vehicles can avoid other vehicles that are not complying with the safety driving obligation during manual driving.

For example, the second controller 250 may generate information on a changeable lane as guide information and control the output of the generated guide information based on the location information of other vehicles that are not complying with the safety driving obligation during manual driving, the location information of the own vehicle, and the location information of the recognized lane.

The second controller 250 may control at least one of the display 270 and the sound output 260 to output the location information of the other vehicle and warning information notifying the attention of the accident with the other vehicle, and control the lane change to avoid other vehicles that are not complying with the safety driving obligation when other vehicles are recognized as non-compliance with the safety driving obligation during autonomous driving, The second controller 250 may control either acceleration or deceleration to avoid other vehicles that are not in compliance with the safety driving obligation.

The vehicle that is not complying with the safety driving obligation may be any one of a drunk driving vehicle, a drowsy driving vehicle, and a forward looking negligent vehicle.

When the image information of the road is received during autonomous driving control, the second controller 250 recognizes the lane of the road by performing image processing, recognizes the own lane where the own vehicle is driving, and recognizes the own lane on the basis of the position information of the recognized lane, and controls autonomous driving based on the position of both lanes.

The second controller 250 may obtain distance information from another vehicle and direction information of the obstacle based on the obstacle information detected by the obstacle detector 220. Here, the distance information from the obstacle may be information about a relative distance between the own vehicle and the obstacle, and the direction information of the obstacle may be information about a relative direction from the own vehicle.

The second controller 250 acquires speed information of the obstacle based on the change in the acquired position information of the obstacle.

The second controller 250 may control lane change, acceleration, and deceleration based on at least one of acquired speed information and distance information of another vehicle.

The second controller 250 may determine whether there is a collision with another vehicle during lane change control and control the output of collision information regarding whether a collision with another vehicle.

The second controller 250 determines whether there is a collision with another vehicle during lane change control, and controls acceleration or deceleration based on the collision with another vehicle.

The second controller 250 can control the output of claxon so that other vehicles can recognize careless driving when another vehicle that is not complying with the safety driving obligation is recognized, and it is also possible to control the lighting of high beams.

The second controller 250 can control the output of the claxon when the distance to another vehicle that is not complying with the safety driving obligation is less than the standard distance, and it is also possible to control the lighting of high beams.

During autonomous driving control, the second controller 250 can control the steering to control the return to the previous lane when it is determined that other vehicles that are not complying with the safety driving obligation have been avoided.

The second controller 250 of the autonomous driving control apparatus may communicate with the braking system 32 and the steering system 42.

The braking system 32 may perform braking in response to a braking signal from the second controller 250 in order to prevent a collision with another vehicle.

The braking system 32 may also perform emergency braking based on the braking signal of the second controller 250.

The steering system 42 may perform steering to adjust a driving path in response to a steering signal from the second controller 250.

The storage 241 may store a preset pattern for recognizing another vehicle that is not complying with the safety driving obligation.

This storage 241 may be implemented with at least one of Non-volatile memory devices such as Programmable ROM (PROM), Erasable Programmable ROM (EPROM), Electrically Erasable Programmable ROM (EEPROM), and Flash memory, Cache, read only memory (ROM), or Non-volatile memory devices such as Programmable ROM (PROM), Erasable Programmable ROM (EPROM), Electrically Erasable Programmable ROM (EEPROM), and Flash memory or a volatile memory device such as random access memory (RAM), or a storage medium such as a hard disk drive (HDD, Hard Disk Drive) but is not limited thereto.

The storage 241 may be a memory implemented as a separate chip from the processor described above with respect to the second controller 250, or may be implemented as a processor and a single chip.

The sound output 250 outputs sound in response to the control command of the second controller 250.

The sound output 250 can output warning information as sound so that other vehicles that are not complying with the safety driving obligation can be alerted. This sound output 250 may be a speaker.

The display 270 may display an image or turn on and off in response to a control command of the second controller 250.

The display 270 displays an image of a road, road guide information, and map information.

The display 270 can output warning information as an image so that other vehicles that are not complying with the safety driving obligation can be alerted.

The display 270 can also display location information of other vehicles that are not complying with the safety driving obligation.

The display 270 can also display video information for avoiding other vehicles that are not complying with the safety driving obligation.

The display 270 may display an autonomous driving mode or a manual driving mode, and may display on-off information of a warning mode.

The display 270 may be a lamp such as an LED or a flat panel display device such as an LCD.

The display 270 may be a display panel to be provided in a vehicle terminal.

Figure 6:
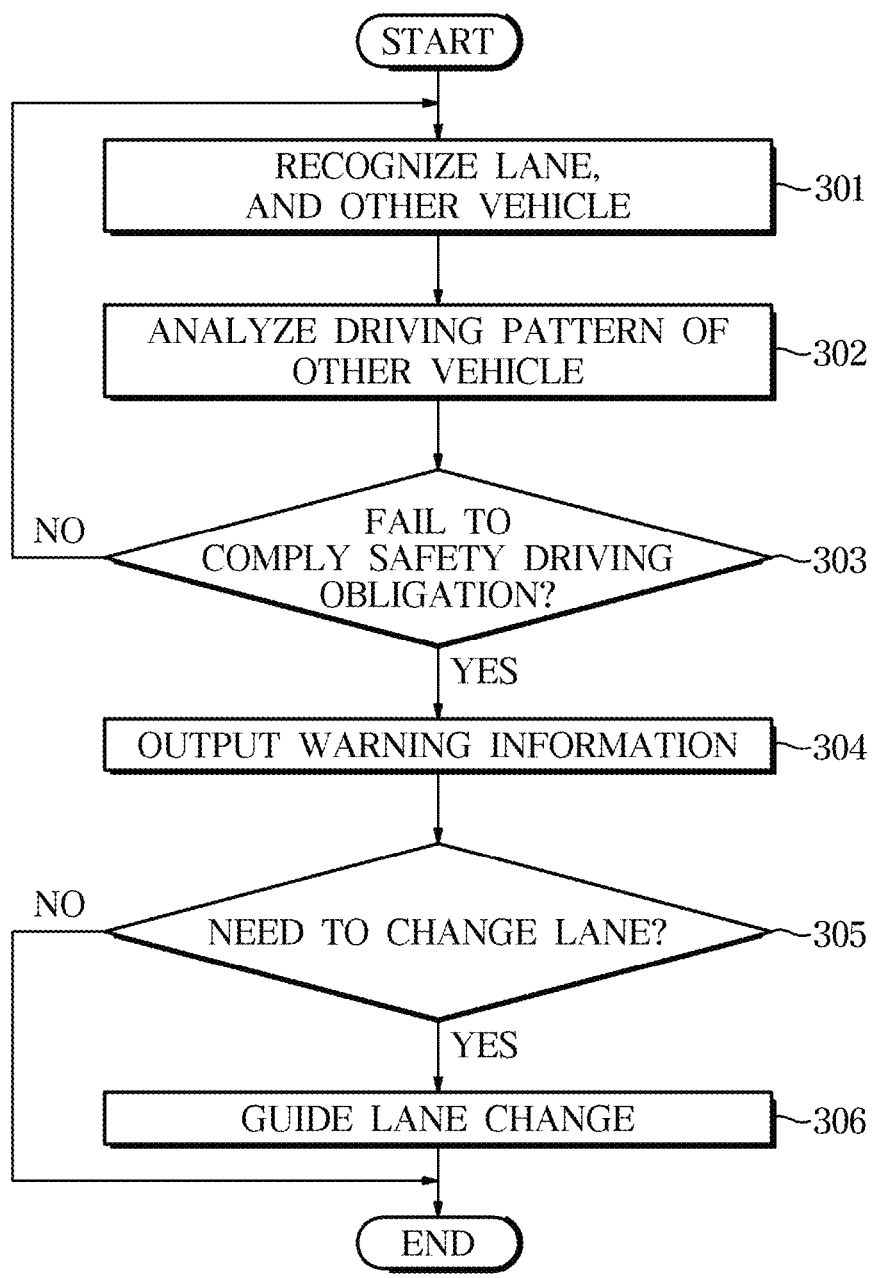
FIG. 6 is a flowchart illustrating a vehicle control according to an exemplary embodiment.
Figure 7:
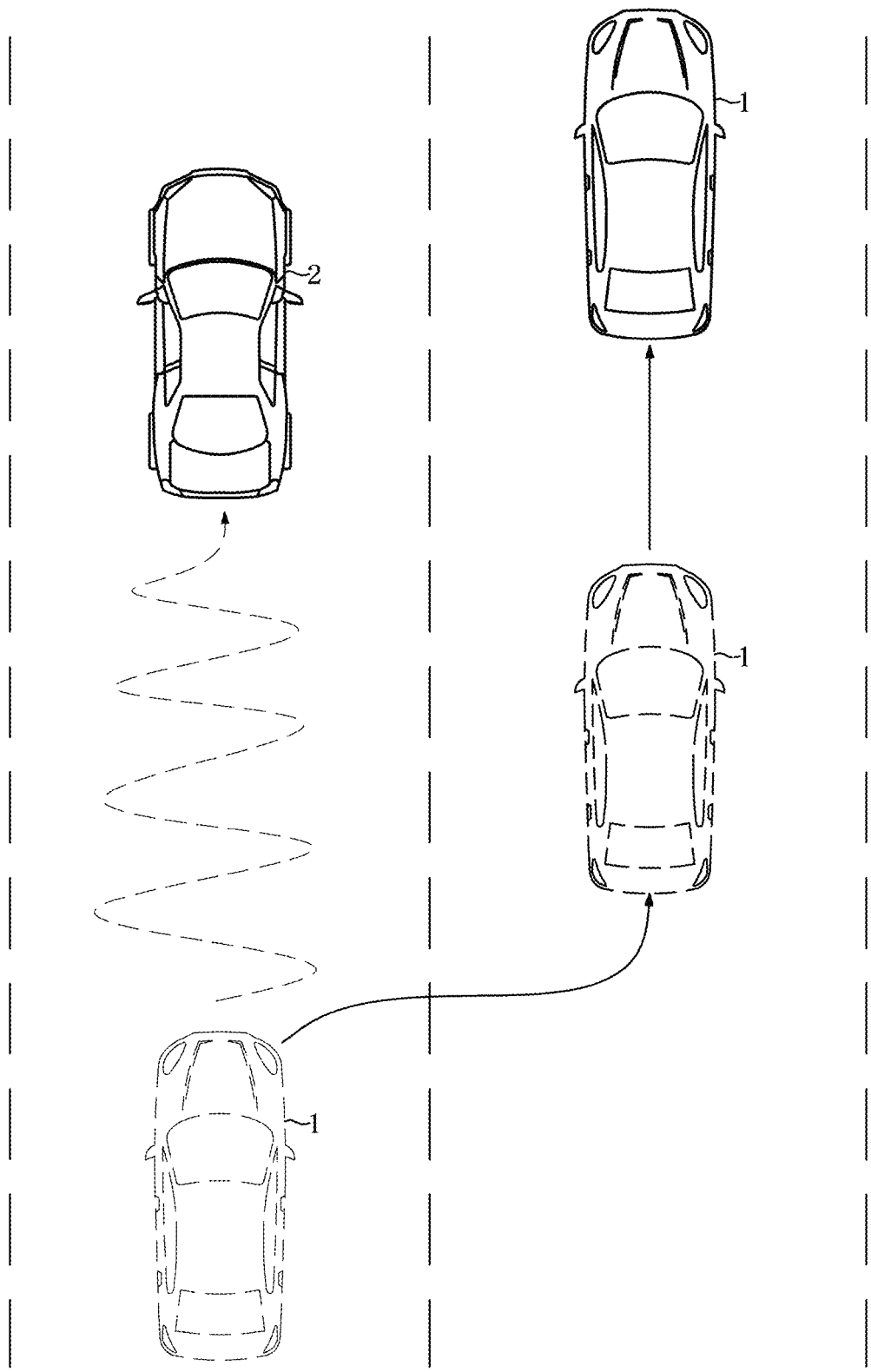
FIGS. 7 and 8 are exemplary diagrams for changing a lane with respect to a result of recognizing a driving pattern of other vehicle in a vehicle according to an exemplary embodiment.
Figure 8:
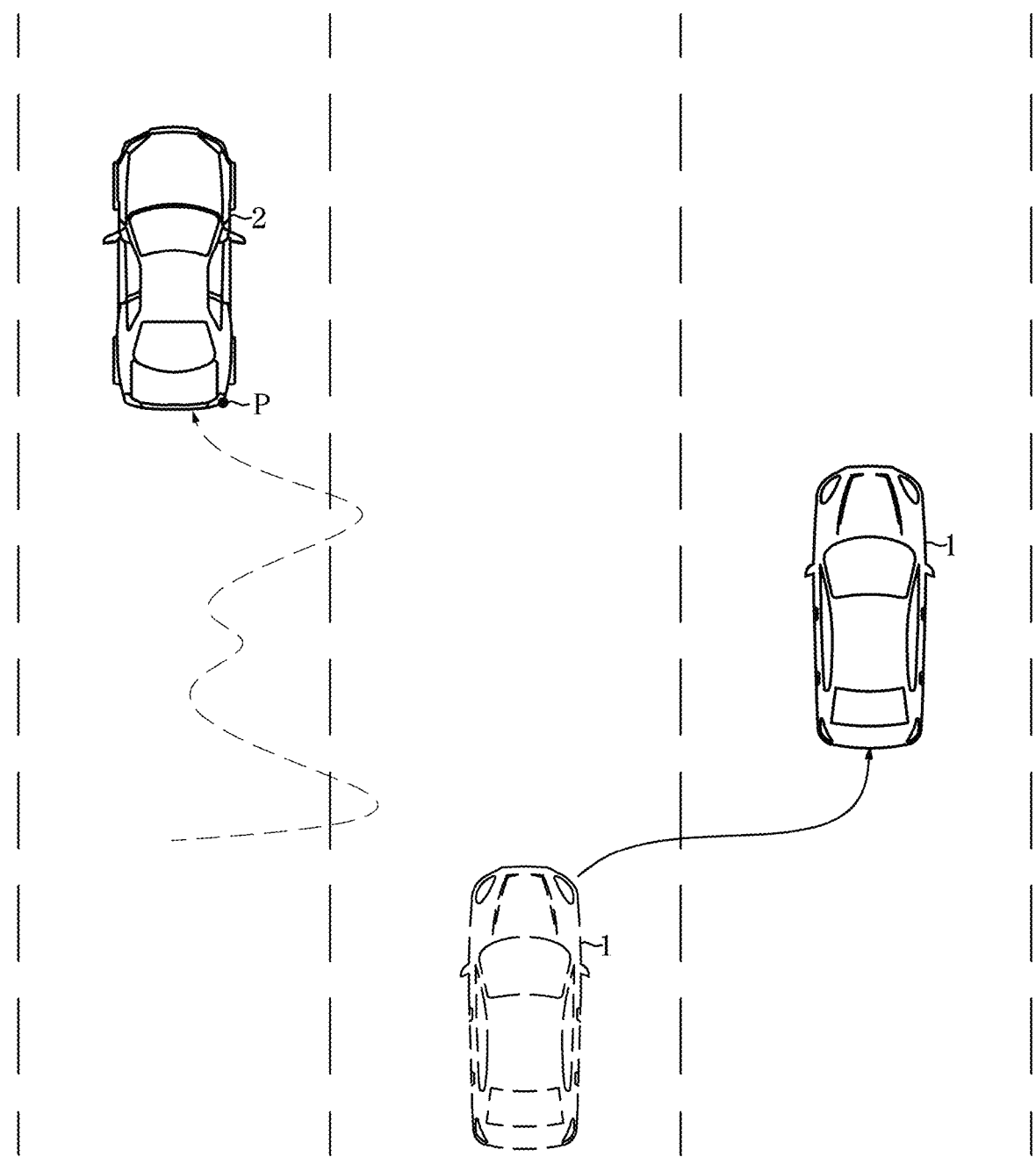

FIG. 6 is a flowchart illustrating a vehicle control according to an exemplary embodiment. FIGS. 7 and 8 are exemplary diagrams for changing a lane with respect to a result of recognizing a driving pattern of other vehicle in a vehicle according to an exemplary embodiment.

The vehicle acquires an image of the road by activating the image acquirer 210 while driving, and processes the acquired road image to recognize (301) a lane of the road and other vehicles within the image, and recognizes a lane in which another vehicle is recognized based on the positions of the recognized lanes.

That is, the vehicle can recognize each of the own lane and other vehicles driving the other lane based on the location information of both lanes in the own lane and the position information of other lanes adjacent to both lanes.

A road in the image may be a road in front of the own vehicle, and a vehicle driving in another lane may be a vehicle driving in a lane different from the own vehicle.

The vehicle recognizes (302) a driving pattern of another vehicle for each recognized lane.

A configuration for recognizing a driving pattern of another vehicle will be described as an example.

For example, the vehicle selects a part of another vehicle, periodically recognizes the position of the selected part, and recognizes a change in the position of the recognized part periodically.

In addition, the vehicle recognizes the driving pattern of another vehicle based on the recognized position change.

The vehicle may recognize the driving pattern of the other vehicle by connecting the positions of one part of the other vehicle that are periodically recognized in the order of time.

One part of the other vehicle may be the upper right corner of the license plate, may be the right corner of the rear panel, or may be an emblem provided on the rear panel side.

When the vehicle recognizes the location of another vehicle, the vehicle may recognize a position change with respect to a relative position of a portion of the other vehicle based on driving information detected by the driving information detector 230. Here, the change in the movement of the subject vehicle may be a change in the movement distance of the subject vehicle in the left and right directions.

As another example, the vehicle periodically recognizes the distance between any one of the two lanes forming the lane of the other vehicle and a portion of the other vehicle, and recognizes the driving pattern of another vehicle based on the change in the distance of one part that is periodically recognized.

The vehicle can recognize the position change of another vehicle based on the information on the distance of one part of the other vehicle that is periodically recognized, and can recognize the driving pattern of the other vehicle by connecting the recognized position changes in the order of time.

The vehicle may recognize a driving pattern of another vehicle based on a change in the position of the other vehicle when the lane and the location of the other vehicle do not overlap in the image.

If it is determined that the position of the lane and the other vehicle overlap in the image, the vehicle may recognize the driving pattern of the other vehicle for lane invasion.

Recognizing a driving pattern of another vehicle for lane invasion may include counting the number of times another vehicle has invaded the same lane.

The vehicle may determine (303) whether the other vehicle is a vehicle that is not complying with the safety driving obligation based on the driving pattern of the other vehicle.

As an example, when the position of a lane and another vehicle does not overlap in the image, the vehicle recognizes a curved driving path among the recognized driving patterns of other vehicles, and identifies a curved driving path having a curvature greater than or equal to the reference curvature among the recognized curved driving paths, and determines that the other vehicle is not complying with the safety driving obligation when the number of confirmed curved roads is greater than or equal to the reference number.

As another example, when the position of a lane and another vehicle does not overlap in the image, the vehicle checks the number of curved roads within the set time, and when the confirmed number is greater than or equal to the reference number, the vehicle can determine that the other vehicle is not complying with the safety driving obligation.

As another example, when the position of a lane and another vehicle does not overlap in the image, the vehicle checks the number of curved roads within the set distance, and when the number is more than the reference number, the vehicle determines that the other vehicle is a vehicle that does not comply with the safety driving obligation.

As another example, when the position of a lane and another vehicle does not overlap in the image, the vehicle compares the recognized driving pattern of another vehicle with a preset pattern to obtain a similarity between the recognized driving pattern of another vehicle and a preset pattern, and when the obtained similarity is greater than or equal to the reference similarity, the vehicle determines that the other vehicle is not complying with the safety driving obligation.

As another example, if it is determined that the position of the lane and other vehicle overlap in the image, the vehicle counts the number of times another vehicle has invaded the same lane, and if the number of counts exceeds the reference number, the vehicle determines that the other vehicle is a vehicle that fails to comply with the safety driving obligation.

When the vehicle determines that the other vehicle is a vehicle that does not comply with the safety driving obligation, the vehicle outputs warning information 304 so that other vehicles can be avoided.

For example, if it is determined that another vehicle driving in front of the vehicle is not complying with the safety driving obligation during manual driving, the vehicle displays the location of the other vehicle on the display 270 based on the location information of the other vehicle, and displays warning information notifying caution about a collision with another vehicle as an image.

If it is determined that another vehicle being driven is a vehicle that does not meet the safety driving obligation, the vehicle determines whether a lane change is necessary based on the location information of the lane in which another vehicle is driving and the location information of the own lane 305, and when it is determined that a lane change is necessary, the vehicle performs lane change guidance for lane change 306.

For example, if it is determined that another vehicle driving in front of the vehicle is not complying with the safety driving obligation during manual driving, the vehicle may display information on a lane capable of avoiding a collision with another vehicle as an image, or may display information on a lane change request as an image.

If it is determined that another vehicle driving in the front during autonomous driving is not complying with the safety driving obligation, the vehicle may recognize a lane capable of avoiding a collision with other vehicles and change lanes to drive in the recognized lane.

In addition, if it is determined that another vehicle driving in the front during manual driving is a vehicle that does not meet the safety driving obligation, the vehicle may acquire a driving speed capable of avoiding a collision with another vehicle based on the driving pattern of the other vehicle and display information on the obtained driving speed as an image.

If it is determined that another vehicle driving in the front during autonomous driving is not complying with the safety driving obligation, the vehicle may acquire a driving speed capable of avoiding a collision with another vehicle and perform acceleration or deceleration based on the obtained driving speed.

If it is determined that other vehicles are avoided during autonomous driving, the vehicle may perform autonomous driving while acquiring the driving speed of the own vehicle, comparing the obtained driving speed with a preset driving speed, and controlling braking and acceleration so that the obtained driving speed becomes a preset driving speed. Here, the preset driving speed may be a speed set by a user.

When described with reference to FIG. 7, when it is determined that another vehicle is a vehicle that is not complying with the safety driving obligation, the vehicle 1 checks the lane the other vehicle 2 is driving and determines whether the identified lane is the same as the own lane, and when it is determined that the lane of another vehicle is the same as that of the own vehicle, the vehicle 1 determines whether it is possible to change the lane to the left or right lane of the own lane based on the driving pattern of the other vehicle, and when it is determined that a lane change to the right lane is possible, the vehicle 1 may perform a lane change guidance to the right lane. In addition, in the case of an autonomous vehicle, the vehicle may change the lane to the right lane.

The vehicle checks the driving speed of the own vehicle, the distance to the other vehicle, and acquires the driving speed to avoid a collision with another vehicle based on the driving speed of the own vehicle and the distance of the other vehicle, and the acquired driving, and the vehicle outputs information about acquired speed information. It is also possible to print out information about driving speed information.

In addition, in the case of an autonomous vehicle, the vehicle may accelerate or decelerate to travel at the acquired driving speed.

In addition, the vehicle can output a claxon if the distance to another vehicle is within a reference distance, or flash high beams to recognize that the other vehicle is not complying with the safety driving obligation.

Referring to FIG. 8, if it is determined that the position of the lane and the other vehicle overlap in the image, the vehicle 1 counts the number of times another vehicle invades the same lane, and If the counted number of times is greater than or equal to the reference number, the vehicle 1 may determine that the other vehicle is a vehicle that fails to fulfill the safety driving obligation.

The vehicle 1 checks the lane the other vehicle 2 is driving and determines whether the identified lane is the same as the own lane, and when it is determined that the lane of another vehicle is different from the lane of the own vehicle, the vehicle 1 determines whether it is necessary to change the lane to the left or right lane of the own lane based on the driving pattern of the other vehicle. When it is determined that a lane change to the right lane is necessary, the vehicle 1 may check the changeable lane and perform lane change guidance for the identified changeable lane. In addition, in the case of an autonomous vehicle, the vehicle may change a lane to a changeable lane.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The present disclosure can minimize the discomfort received by the driver by adjusting the position of the lane in the image based on the distance from the object such as curb or guardrail of the road.

According to the present disclosure, if a lane is not recognized in an acquired image, a virtual lane is generated based on an average lane width, and a warning about lane departure determination and lane departure is performed based on the generated virtual lane, thereby providing accuracy for lane departure determination to increase the reliability of lane departure warnings.

Accordingly, the present disclosure can prevent collisions with other vehicles, improve driving stability, and lower the driver's tension while driving.

As described above, the present disclosure can improve usability, quality, and merchandise of the vehicle maintenance apparatus and the vehicle, and further increase the satisfaction of the user and secure the competitiveness of the product.

The present disclosure recognizes a vehicle that is not complying with the safety driving obligation and outputs warning information for preventing an accident with other vehicles, thereby improving the safety of driving and flexibly responding to various situations on the road.

The present disclosure can reduce the risk of a traffic accident by recognizing other vehicles that are not complying with the safety driving obligation and outputting warning information about negligence of driving so that the driver of the other vehicle recognizes negligence of driving.

According to the present disclosure, it is possible to recognize other vehicles that are not complying with the safety driving obligation by using only the front camera in a state in which the hardware configuration is not added, thereby preventing an increase in vehicle cost and improving vehicle safety.

As described above, the present disclosure can improve the quality and marketability of a vehicle having a driver assistance system and a driver assistance system, and further increase user satisfaction and secure product competitiveness.

DESCRIPTION OF SYMBOLS

1: vehicle
100: driver assistance system
110: front camera
120: front radar
130: corner radars
131: first corner radar
132: second corner radar
133: third corner radar
134: fourth corner radar
140: first controller
200: warning apparatus
250: second controller
251: storage

What is claimed is:

1. An advanced driver assistance system, comprising:
a camera configured to acquire an image of a road of a vehicle;
a controller having a processor configured to process the acquired image of the road; and
a display configured to display the image in response to a control command of the controller, wherein
the controller is configured to recognize lanes and other vehicles from the acquired road image, and, when the lane and the other vehicle do not overlap in the acquired road image, identify curved driving paths of the other vehicle having curvatures greater than or equal to a reference curvature and determine that the other vehicle fails to comply with a safety driving obligation if a number of the curved driving paths of the other vehicle having the curvatures greater than or equal to the reference curvature is greater than or equal to a first reference number, when the lane and the other vehicle overlap in the acquired road image, count a number of times in which the other vehicle has invaded the lane and determine that the other vehicle fails to comply with the safety driving obligation if the number of times in which the other vehicle has invaded the lane is greater than or equal to a second reference number, and control a steering device of the vehicle to perform a lane change based on determination that the other vehicle fails to comply with the safety driving obligation.

2. The advanced driver assistance system of claim 1, further comprising:
an output configured to output the warning information in response to the control command of the controller as a sound.

3. The advanced driver assistance system of claim 1, wherein the controller is configured to control the display to display the location information of the other vehicle.

4. The advanced driver assistance system of claim 1, wherein the controller is configured to recognize a driving pattern of the other vehicle based on a change in the distance between the recognized lane and the recognized vehicle, and determine whether the other vehicle is a vehicle that fails to comply with the safety driving obligation based on the recognized driving pattern.

5. The advanced driver assistance system of claim 1, wherein the controller is configured to count a number of the other vehicle's infringement of the lane, determine that the other vehicle has infringed on the lane when it is determined that the recognized lane and the recognized other vehicle overlap in the acquired road image, and determine whether the other vehicle is a vehicle that fails to comply with the safety driving obligation based on the number of infringement of the lane.

6. The advanced driver assistance system of claim 1, wherein the controller is configured to recognize a driving pattern of the other vehicle based on the recognized location change of the other vehicle, and determine whether the other vehicle is a vehicle that fails to comply with the safety driving obligation based on the recognized driving pattern.

7. The advanced driver assistance system of claim 6, wherein the controller is configured to recognize the lane that the other vehicle is driving and the own lane, and determine whether a lane change is necessary based on the recognized location information of the lane of the other vehicle, the location information of the own lane, and the driving pattern of the other vehicle, and guide the change of lane through the display when it is determined that the lane change is necessary.

8. The advanced driver assistance system of claim 6, wherein the controller is configured to recognize the lane that the other vehicle is driving and the own lane when performing autonomous driving, and control the lane change based on the recognized location information of the lane of the other vehicle, the location information of the own lane, and the driving pattern of the other vehicle.

9. A vehicle, comprising:
a camera configured to acquire an image of a road of the vehicle;
a controller configured to recognize other vehicles from the acquired road image, recognize the recognized driving pattern of the other vehicle based on the recognized location information of the other vehicle, determine whether the other vehicle is a vehicle that fails to comply with a safety driving obligation based on the recognized driving pattern, and control to output warning information when it is determined that the other vehicle is a vehicle that does not comply with the safety driving obligation; and
a display configured to display the warning information and the location information of the other vehicle in response to a control command of the controller,
wherein the controller is configured to, when the lane and the other vehicle do not overlap in the acquired road image, identify curved driving paths of the other vehicle having curvatures greater than or equal to a reference curvature and determine that the other vehicle fails to comply with the safety driving obligation if a number of the curved driving paths of the other vehicle having the curvatures greater than or equal to the reference curvature is greater than or equal to a first reference number, when the lane and the other vehicle overlap in the acquired road image, count a number of times in which the other vehicle has invaded the lane and determine that the other vehicle fails to comply with the safety driving obligation if the number of times in which the other vehicle has invaded the lane is greater than or equal to a second reference number, and control a steering device of the vehicle to perform a lane change based on determination that the other vehicle fails to comply with the safety driving obligation.

10. The vehicle of claim 9, wherein the controller is configured to recognize a lane in the acquired road image, recognize the change in distance between the lane and the other vehicle based on the recognized location information of the lane and the recognized location information of the other vehicle, and recognize the driving pattern of the other vehicles based on the recognized distance change.

11. The vehicle of claim 9, wherein the controller is configured to count a number of the other vehicle's infringement of the lane, determine that the other vehicle has infringed on the lane when it is determined that the recognized lane and the recognized other vehicle overlap in the acquired road image, and determine whether the other vehicle is a vehicle that fails to comply with the safety driving obligation based on the number of infringement of the lane.

12. The vehicle of claim 9, wherein the controller is configured to recognize the lane that the other vehicle is driving and the own lane, and determine whether a lane change is necessary based on the recognized location information of the lane of the other vehicle, the location information of the own lane, and the driving pattern of the other vehicle, and guide the change of lane through the display when it is determined that the lane change is necessary.

13. The vehicle of claim 9, wherein the controller is configured to recognize the lane that the other vehicle is driving and the own lane when performing autonomous driving, and control the lane change based on the recognized location information of the lane of the other vehicle, the location information of the own lane, and the driving pattern of the other vehicle.

14. The vehicle of claim 9 further comprising:
an obstacle detector configured to detect a distance to the other vehicle; and wherein
the controller is configured to control an operation of claxon or high beam when the distance to the other vehicle is less than a reference distance.

15. A controlling method of a vehicle, comprising:
by a camera, acquiring a road image while driving of the vehicle;
by a controller having a processor configured to process the acquired road image, recognizing other vehicles and lanes from the acquired road image;
by the controller, when the lane and the other vehicle do not overlap in the acquired road image, identifying curved driving paths of the other vehicle having curvatures greater than or equal to a reference curvature and determining that the other vehicle fails to comply with a safety driving obligation if a number of the curved driving paths of the other vehicle having the curvatures greater than or equal to the reference curvature is greater than or equal to a first reference number;
by the controller, when the lane and the other vehicle overlap in the acquired road image, counting a number of times in which the other vehicle has invaded the lane and determining that the other vehicle fails to comply with the safety driving obligation if the number of times in which the other vehicle has invaded the lane is greater than or equal to a second reference number; and
by the controller, controlling a steering device of the vehicle to perform a lane change based on determination that the other vehicle fails to comply with the safety driving obligation.

16. The method according to claim 15, wherein recognizing the driving pattern of the other vehicle includes recognizing a driving pattern of the other vehicle based on a change in the distance between the recognized lane and the recognized vehicle, and determine whether the other vehicle is a vehicle that fails to comply with the safety driving obligation based on the recognized driving pattern.

17. The method according to claim 16, wherein determining whether the other vehicle is a vehicle that fails to comply with a safety driving obligation includes:
by the controller, counting a number of the other vehicle's infringement of the lane,
determining as a lane infringement of the other vehicle when it is determined that the recognized lane and the recognized other vehicle overlap in the acquired road image, and
determining whether the other vehicle is a vehicle that fails to comply with the safety driving obligation based on the number of infringement of the lane.

18. The advanced driver assistance system of claim 1, wherein the controller is configured to determine whether the other vehicle is a vehicle that fails to comply with the safety driving obligation based on at least one of a curvature of the driving pattern of the other vehicle, the number of times that the curvature is changed within a set time, and the number of times that the curvature is changed within a set distance.

19. The vehicle of claim 9, wherein the controller is configured to determine whether the other vehicle is a vehicle that fails to comply with the safety driving obligation based on at least one of a curvature of the driving pattern of the other vehicle, the number of times that the curvature is changed within a set time, and the number of times that the curvature is changed within a set distance.

20. The method according to claim 15, wherein the determining of whether the other vehicle is a vehicle that fails to comply with the safety driving obligation based on the recognized driving pattern comprises determining whether the other vehicle is a vehicle that fails to comply with the safety driving obligation based on at least one of a curvature of the driving pattern of the other vehicle, the number of times that the curvature is changed within a set time, and the number of times that the curvature is changed within a set distance.

* * * * *